(12) United States Patent
Lawless et al.

(10) Patent No.: US 9,701,482 B2
(45) Date of Patent: Jul. 11, 2017

(54) MOBILIZATION DEVICE

(71) Applicants: Kevin Wilson Lawless, Hilton Head Island, SC (US); Charles Phillip Palanca, Kalamazoo, MI (US); Phillip E. Chorney, Armada, MI (US)

(72) Inventors: Kevin Wilson Lawless, Hilton Head Island, SC (US); Charles Phillip Palanca, Kalamazoo, MI (US); Phillip E. Chorney, Armada, MI (US)

(73) Assignee: ENHANCED MOBILIZATION SYSTEM, INC., Kalamazoo, MI (US)

( * ) Notice: Subject to any disclaimer, the term of this patent is extended or adjusted under 35 U.S.C. 154(b) by 0 days.

(21) Appl. No.: 13/838,449

(22) Filed: Mar. 15, 2013

(65) Prior Publication Data

US 2013/0213764 A1 Aug. 22, 2013

Related U.S. Application Data

(63) Continuation-in-part of application No. 13/051,308, filed on Mar. 18, 2011.

(60) Provisional application No. 61/315,831, filed on Mar. 19, 2010.

(51) Int. Cl.
| | |
|---|---|
| *B60B 35/04* | (2006.01) |
| *B65G 41/00* | (2006.01) |
| *B60B 33/00* | (2006.01) |
| *B60B 33/04* | (2006.01) |
| *B60B 35/08* | (2006.01) |

(52) U.S. Cl.
CPC .......... *B65G 41/008* (2013.01); *B60B 33/001* (2013.01); *B60B 33/0021* (2013.01); *B60B 33/0023* (2013.01); *B60B 33/04* (2013.01); *B60B 35/04* (2013.01); *B60B 35/08* (2013.01); *B60B 2200/242* (2013.01); *B60B 2200/26* (2013.01); *B60B 2900/351* (2013.01); *B60B 2900/551* (2013.01)

(58) Field of Classification Search
CPC ............................................. B60P 1/64–1/649
USPC ....... 280/47.131, 47.15–47.21, 47.24–47.29, 280/638–639, 47.35–47.41
See application file for complete search history.

(56) References Cited

U.S. PATENT DOCUMENTS

| | | | |
|---|---|---|---|
| 3,427,668 A | | 2/1969 | McManus, Jr. |
| 5,432,966 A | * | 7/1995 | Berta .................. A61G 1/0562 296/20 |

(Continued)

FOREIGN PATENT DOCUMENTS

WO WO 2007/109267 A2 9/2007

OTHER PUBLICATIONS

PCT Int'l App. No. PCT/US2011/028986 filed Mar. 18, 2011 May 3, 23011—International Search Report and Written Opinion.

*Primary Examiner* — Erez Gurari
(74) *Attorney, Agent, or Firm* — Reising Ethington PC (57) ABSTRACT

A mobilization device adapted to be attached to a piece of conveying equipment such as a gurney. The device includes a base. The coupling structure is connected with the base for supporting at least a portion of the conveying equipment. The device also includes a wheel assembly that is sized to hold the wheels of the conveying equipment off of the ground. The wheel assemblies of the device are used to move the conveying equipment and include tires having a relatively larger height and width to aid in increasing the mobility of the conveying equipment.

12 Claims, 9 Drawing Sheets

(56) References Cited

U.S. PATENT DOCUMENTS

| | | | |
|---|---|---|---|
| 6,213,491 B1* | 4/2001 | Southard, Jr. | B60D 1/66 |
| | | | 254/420 |
| 6,561,529 B2 | 5/2003 | Darling, III | |
| 6,585,206 B2 | 7/2003 | Metz et al. | |
| 6,698,811 B1 | 3/2004 | Schuchman | |
| 7,328,907 B1* | 2/2008 | Bileth | 280/79.11 |
| 7,461,857 B2 | 12/2008 | Darling, III | |
| 7,641,213 B1* | 1/2010 | Chen | 280/293 |
| 7,938,426 B2* | 5/2011 | Trout | 280/293 |
| 2003/0071426 A1* | 4/2003 | Larouche | B62B 5/0083 |
| | | | 280/47.2 |

* cited by examiner

MOBILIZATION DEVICE

FIELD OF THE INVENTION

The present invention relates generally relates to a mobilization device. More specifically, the present invention relates to mobilization device that can be used in conjunction with conveying equipment such as a gurney to increase the ability of the conveying equipment to traverse terrain.

BACKGROUND OF THE INVENTION
SUMMARY OF THE INVENTION

Medical patient conveying equipment, such as cots, gurneys or carts typically have wheels for facilitating movement of patients on the equipment. The wheels typically are supported on the bottom of a frame which may be a fixed frame or a foldable frame. Such frames are well known. The wheels used on such equipment typically are of a relatively small diameter and are typically relatively thin.

Medical personnel, such as EMS personnel, paramedics or the like often have to convey patients from a remote site to a vehicle such as an ambulance. Often, the terrain between the remote site and the location of the ambulance is hostile and is often difficult to pass. Such hostile terrain may include uneven or pitched terrain, or may include brush, snow, sand, etc. Conveying equipment is not adequately designed to traverse pathways to typical trauma sites impeded by such hostile terrain, making it relatively difficult to move the conveying equipment carrying the patient and/or medical equipment. Weight of the patient may exacerbate the situation.

If medical personnel have difficulty getting the medical equipment to the patient or the patient to the ambulance, timeliness of patient treatment may be compromised. Accordingly it would be desirable to provide a device that can enhance the mobility of such conveying equipment to reduce the effect of impediments in the pathway of the conveying equipment.

SUMMARY OF THE INVENTION

According to an embodiment, there is provided a mobilization device adapted to be attached to a piece of conveying equipment. The device may comprise a base and an axle supported on the base. The device further may comprise at least one wheel assembly disposed on the axle. The device further may comprise a coupling receiver disposed on said base. The coupling receiver may include a surface capable of supporting at least a portion of the conveying equipment.

According to an embodiment, there is provided a mobilization device adapted to be attached to a piece of conveying equipment comprising a base having a wheel assembly mounting portion. A wheel support assembly is disposed on the wheel assembly mounting portion. A wheel assembly is connected to the wheel support assembly. The mobilization device further comprises a coupling portion engaging the base. The coupling portion supports at least a portion of the conveying equipment.

According to an embodiment, there is provided a mobilization device comprising a base. The device further comprises a portion connected with the base and for supporting at least a portion of the conveying equipment. The device further comprises a wheel assembly connectable with the base wherein the wheel assembly is sized so as to hold a piece of conveying equipment off the ground.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
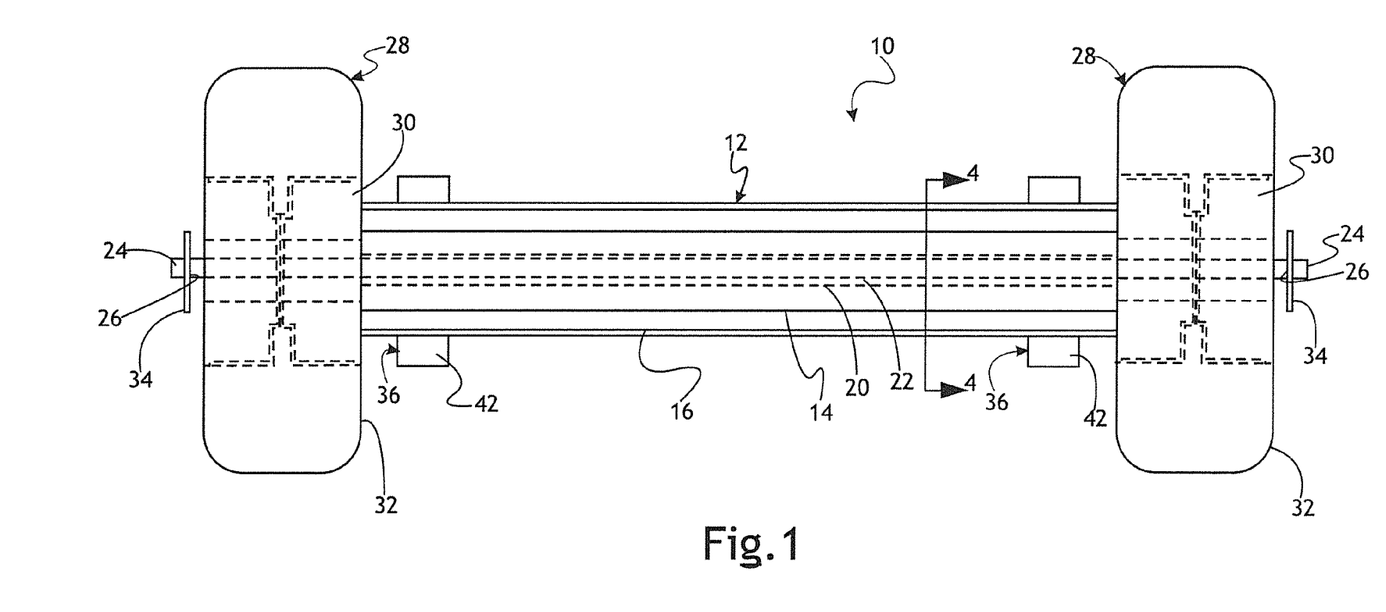
FIG. 1 is a bottom view of one embodiment.
Figure 2:
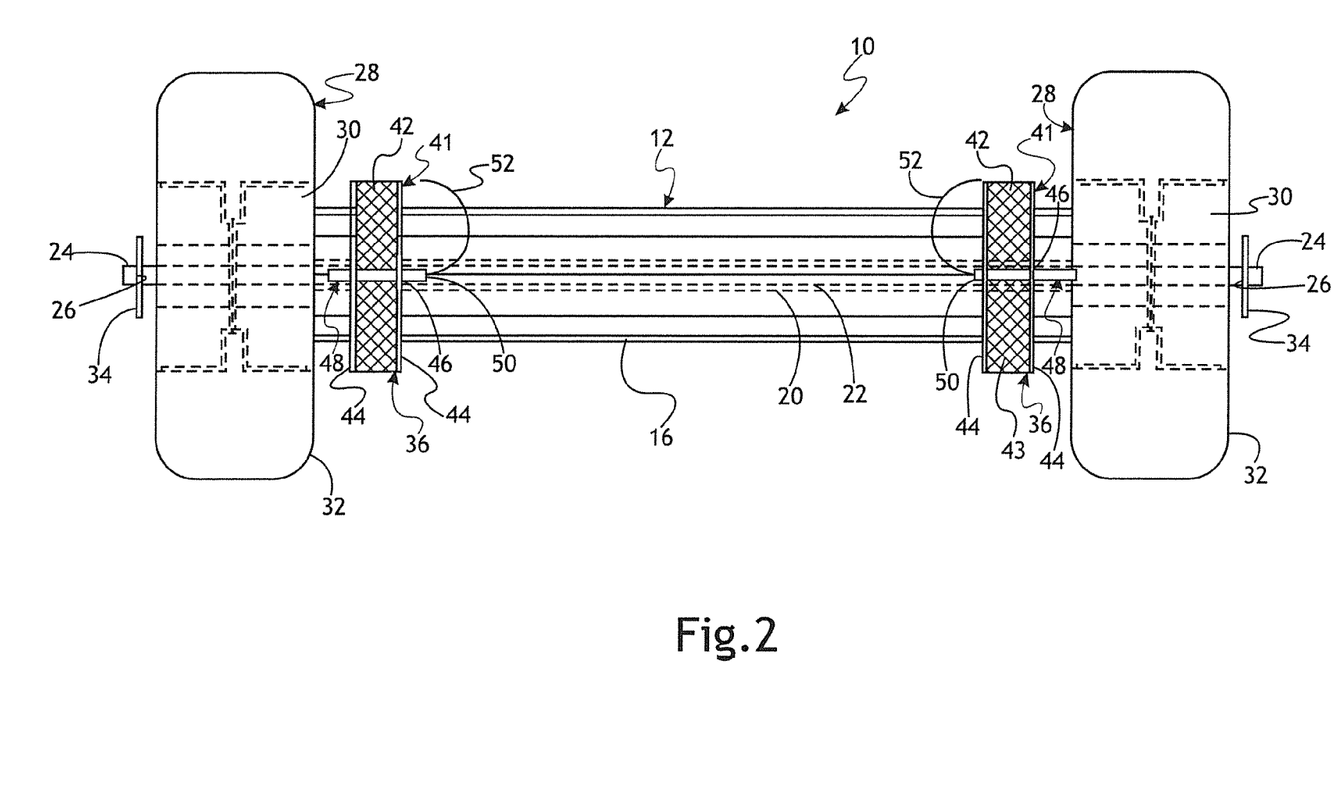
FIG. 2 is a top view of one embodiment.
Figure 3:
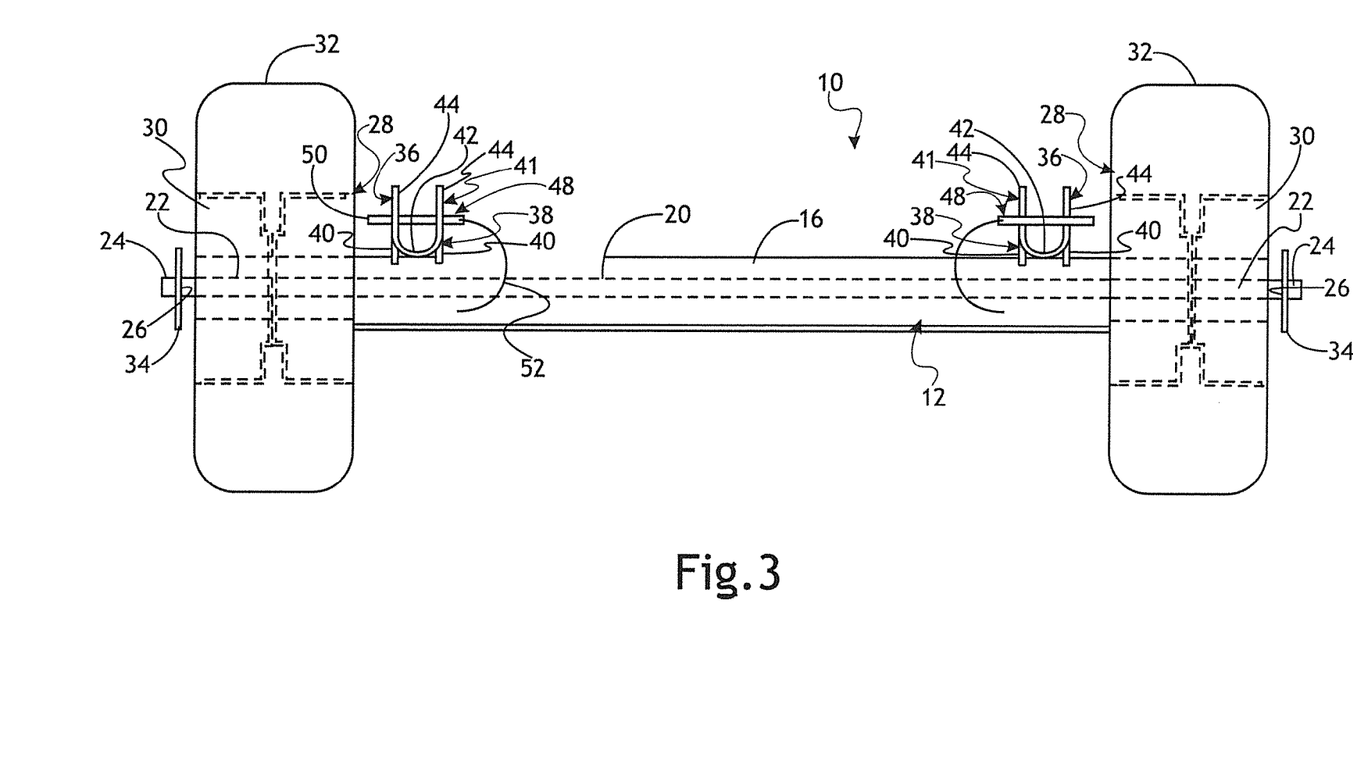
FIG. 3 is a front elevational view of one embodiment.
Figure 4:
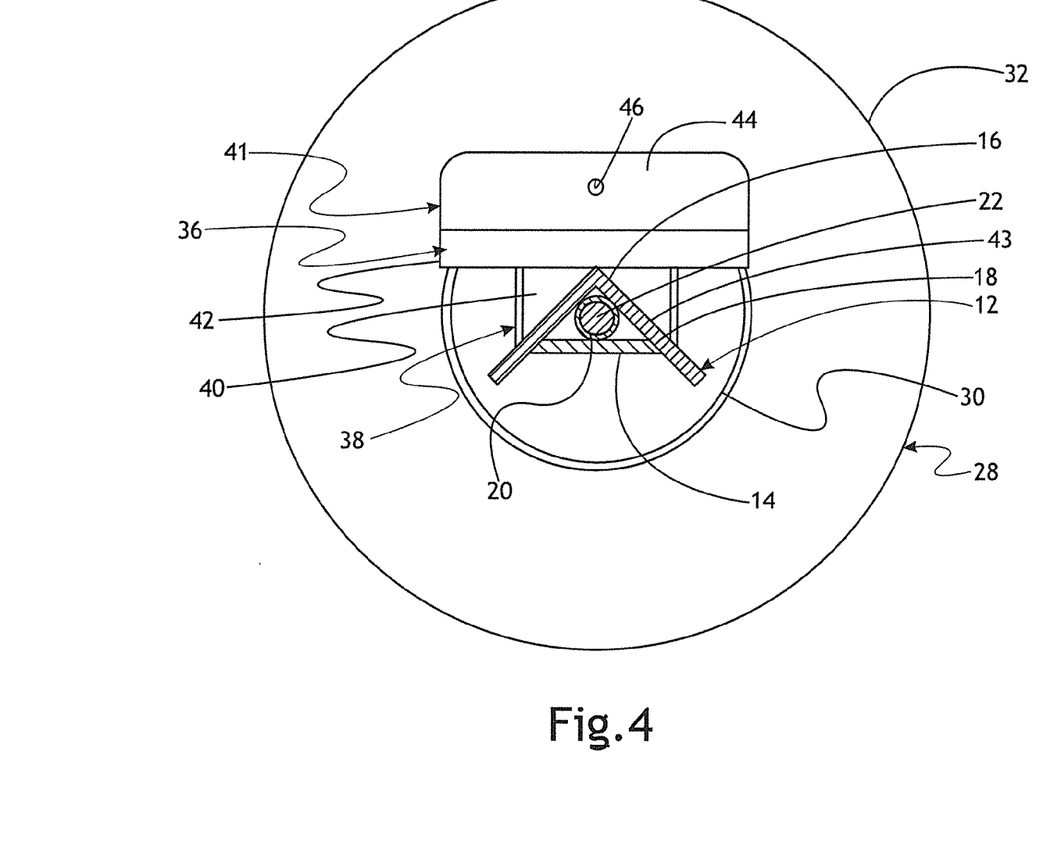
FIG. 4 is a cross-sectional view of one embodiment taken along lines 4-4 of FIG. 1.

A mobilization device is generally shown at 10, 10' in the Figures. The device 10 may include a base, generally indicated at 12. In one embodiment, the base 12 includes a bottom 14 (best seen in FIG. 1) and a top 16 (best seen in FIG. 2). The bottom 14 may comprise a flat, generally rectangular bar. As best shown in FIG. 4, the side edges 18 of the bottom 14 may be angled to abut with the top 16. The bottom 14 may be made of any suitable material, including plastic, metal or composite material or combinations. In one embodiment, the bottom 14 comprises aluminum. Further, the bottom 14 may take any suitable geometric configuration. In some embodiments, the bottom 14 may be eliminated.

In one embodiment the top 16 may comprise an angled bar. The angle may be 90 degrees. The top 16 may come to an apex. The bottom 14 may cooperate with the top 16, and fit with the angled bar, as best seen in FIG. 4. The top 16 may be made of any suitable material, including plastic, metal or composite material or combinations. In one embodiment, the top 16 comprises a 90 degree angled aluminum bar. It will be appreciated that in other embodiments, the top 16 may take other geometric configurations. By way of non-limiting example, rather than come to an apex, the top 16 may have a generally flat upper surface (not shown). In such an embodiment, the top, having the generally flat upper surface may include depending sides, such that the top 16 may take the shape having a generally inverted u-shape with a relatively flat upper surface.

The device 10 may also include an axle housing 20. The axle housing 20 may be secured between the bottom 14 and the top 16. The axle housing 20 may comprise a tube having a circular cross section. The axle housing 20 can comprise any suitable material, including plastic, metal or composite material or combinations. In one embodiment, the axle housing 20 comprises aluminum pipe. In one embodiment, the axle housing 20 may be secured to the top 16. The axle housing 20 may be secured to the inside of the angle bar by any suitable method. By way of non-limiting example, the axle housing 20 may be welded to the top 16 such that it is positioned adjacent the apex. The bottom 14 may also be secured to the top 16 such as by welding. In this manner, the axle housing 20 is secured to the base 12 and is positioned between the top 16 and bottom 14.

In one embodiment an axle 22 is supported within the axle housing 20. The end 24 of the axle 22 may protrude outwardly of the axle housing 20 to support a tire as will be described in greater detail below. In one embodiment, the axle 22 will protrude outwardly of the axle housing 20 from each end of the axle housing 20 to support a wheel assembly 28 on each end 24 of the axle 22. The axle 22 may comprise a rod having a generally circular cross section. The axle 22 may include an aperture 26 through each end 24. The axle 22 may be disposed in the axle housing 22. The axle housing 22 may comprise any suitable material, such as plastic, metal or composite material or combinations. In one embodiment, the axle comprises a stainless steel rod.

In one embodiment, the axle 20 may not be fixed within the axle housing 22 and may rotate relative thereto. It will be appreciated that the axle 22 may be fixed within the axle housing 20, such as by welding the axle 22 to the axle housing 20, or by proving a friction fit that will limit relative rotational movement between the axle 22 and axle housing 20. In one embodiment, the axle housing 20 may be eliminated. In such embodiment, the axle 22 may be secured directly to the base 12.

In one embodiment, the axle 22 may comprise separate axle components (not shown) each extending outwardly from the axle housing 20 in opposite directions. In this manner, the axle components, such as two axle rods may be secured to the axle housing 20 by any suitable method. As with an embodiment described above, the axle housing 20 may be eliminated. In this embodiment, the separate axle components may be secured near the outer edges of the base 12 and extend outwardly therefrom. Thus, the axle 22 is supported by the base 12 either by being connected directly to the base 12 or indirectly to the base 12 via the axle housing 20.

A wheel assembly, generally indicated at 28 may be mounted on each end 24 of axle 22. The wheel assembly 28 comprises a hub 30 and a tire 32. The hub 30 may include internal bearings (not shown) that allow the wheel assembly 28 to rotate about the axle 22 in conventional manner. Thus, the wheel assembly 28 is rotatably disposed on the axle 22. The hub 30 can comprise any suitable material, including plastic, metal or composite material or combinations.

The tire 32 is disposed about the hub. In one embodiment, the tire 32 is a pneumatic tire that can include an inner-tube (not shown) or be of the tubeless variety, as are well-known. The tire 32 may also include a tread, but a tread is not necessary. Any suitable tread design may be used.

The wheel assembly 28 may be sized so that it can hold the conveying equipment off the ground during use. (FIG. 6) In one embodiment, the outer diameter of the tire 32 may be up to about 13 inches. Also, in one embodiment, the width of the tire 32 may be up to about 5 inches. The specific outer diameter and width of the tire 32 may differ, and any suitable size may be used. Further, it is preferred that the wheel assembly 28 have sufficient load rating to allow the wheel assembly 28 to be used in the device 10 to convey the equipment and any necessary load on the conveying equipment, such as a patient or medical equipment. In one embodiment, the wheel assembly 28 may have a load rating at or above four hundred and thirty-five pounds.

The wheel assembly 28 is retained on the axle 22 by a retaining pin 34 disposed through the aperture 26 in the axle 22. In one embodiment, the retaining pin 34 comprises a hitch pin having a locking clip as are well known. In one embodiment, the retaining pin 34 comprises a cotter pin. The retaining pin 34 may comprise any configuration suitable to retain the wheel assembly 28 on the axle 22. In one embodiment, two retaining pins 34 are used, one through each aperture 26 on each end 24 of axle 22. In this manner, two wheel assemblies 28 are retained on the axle 22 on opposite ends of the axle 22 and outwardly of the base 12.

The device 10 may further comprise a coupling receiver, generally shown at 36. The coupling receiver 36 may be disposed on the base 12. In one embodiment, the coupling receiver 36 is secured to the top 14. The coupling receiver 36 may include a connecting portion, generally indicated at 38. The connecting portion 38 may be secured to the top 16. In one embodiment, the connecting portion 38 comprises two upstanding walls 40. The upstanding walls 40 may be generally rectangular in shape, having a v-shape cut out area 43. The v-shape cut out area 43 may accept the top 14, as best seen in FIG. 4. Two upstanding walls 40 may be slightly spaced from one another. The upstanding walls 40 may comprise any suitable material, including metal, plastic or composite material or combinations. In one embodiment, the upstanding walls 40 comprise aluminum plates. The upstanding walls 40 may be fixed from to the top 14 by any suitable means. By way of non-limiting example, the upstanding walls 40 may be welded to the top 14. In another embodiment (not shown) the connecting portion 38 may be secured to the top 14 in a sliding arrangement such as in a track secured to the top 14 that can selectively be locked in place. That is, the upstanding walls may be retained in a track that may be secured on the top 14. In this embodiment, the connecting portion 38 may be selectively positioned along the longitudinal axis of the top 14 at any desired location and then locked thereto, such as by the use of a set screw or any other securment mechanism used to retain the upstanding walls to the track or top. This embodiment allows the device 10 to be secured to conveying equipment having support structures of varying positions.

The coupling receiver 36 may further include a receiving element, generally indicated at 41 for receiving and supporting at least a portion of the conveying equipment. In one embodiment, the receiving element 41 may comprise a generally u-shape channel member, having a U-shaped base portion 42 and a pair of opposing upstanding walls 44. The receiving element 41 may be disposed on the upper portion of the upstanding walls 40. In this manner, the receiving element 41 is supported above the top 14. The receiving element 41 may comprise any suitable material, including metal, plastic or composite material or combinations. In one embodiment, the receiving element 41 may comprise aluminum bar that is machine rolled into the U-shape channel member. The diameter of the base portion 42 may be such that it can accept a portion of the conveying equipment. Thus the conveying equipment, and typically a support structure thereof can be disposed in the receiving element 41 between the upstanding walls 44 and on the base portion 42. (FIG. 6) The base portion 42, upstanding walls 44 or both may also include a friction surface 43, such as a textured surface or anti-slip pad thereon. In this way, the friction surface may aid holding the conveying equipment in place. The receiving element may be disposed such that the longitudinal axis of the receiving element is generally perpendicular to the longitudinal axis of the top 14.

Figure 6:
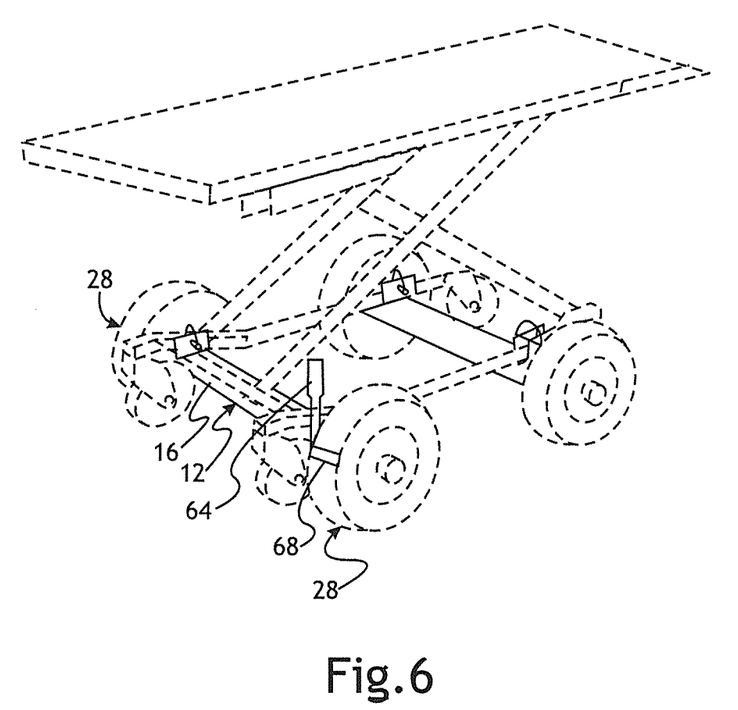
FIG. 6 is a perspective view of one embodiment attached to conveying equipment.
Figure 7:
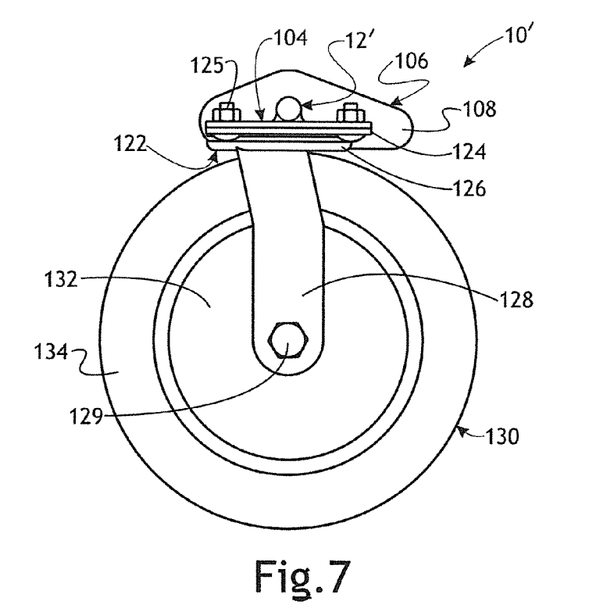
FIG. 7 is an end view of an embodiment.

Each upstanding wall 44 may further include at least one aperture 46 therethrough. The aperture 46 may receive a retaining clip, generally indicated at 48. In one embodiment, the retaining clip 48 may comprise a clevis pin 50 having a generally D-shaped locking member 52. One end of the D-shaped locking member 52 may be pivotally secured to one end of the clevis pin 50. The other end of the D-shaped locking member 52 may selectively engage and coact with the other end of the retaining clevis pin 50 in conventional manner. The aperture 46 may be positioned on the upstanding wall 44 at any suitable location. In one embodiment, the aperture 46 may be positioned such that it will allow the clevis pin 50 to be disposed on top of any portion of the conveying equipment that is supported in the receiving element 41 (FIG. 6). It will be appreciated that while one aperture 46 is shown through each upstanding wall 44, any number of apertures 46 may be used. Further, the apertures 46 may be at different heights with respect to the base portion 42 to accommodate portions of conveying equipment of different sizes. It will be further appreciated that the retaining clip may take any suitable configuration.

In one embodiment as shown in the Figures, the receiving element 41 is disposed in a manner that is generally parallel with the ground and may be fixed in that position. In another embodiment (not shown) the receiving element may be pivotal between different positions and selectively locked in place. In this embodiment, the receiving element 41 may be pivoted such that it is disposed at any angle with respect to the ground such that the receiving element 41 can accommodate structures of the conveying equipment that are other than generally horizontal.

Conventional conveying equipment (a portion of which is shown in FIG. 6) typically include wheels disposed on some type of support structure or legs. Often the front and rear legs of the conveying equipment are connected by a support structure that is generally horizontally disposed between the front and rear legs of the conveying equipment. In this case, the receiving element 41 may be disposed generally horizontally to receive the support structure of the conveying equipment as seen in FIG. 6. In other instances, the legs may be angles such as at about a 45 degree angle with respect to the ground and may not include a horizontal support structure between the front and rear legs. To accommodate this situation, an embodiment (not shown) may allow the receiving element 41 to be pivoted and angled with respect to the ground to receive the angled leg of the conveying equipment. Then the receiving element 41 may be secured in place relative to the top 16.

Figure 5:
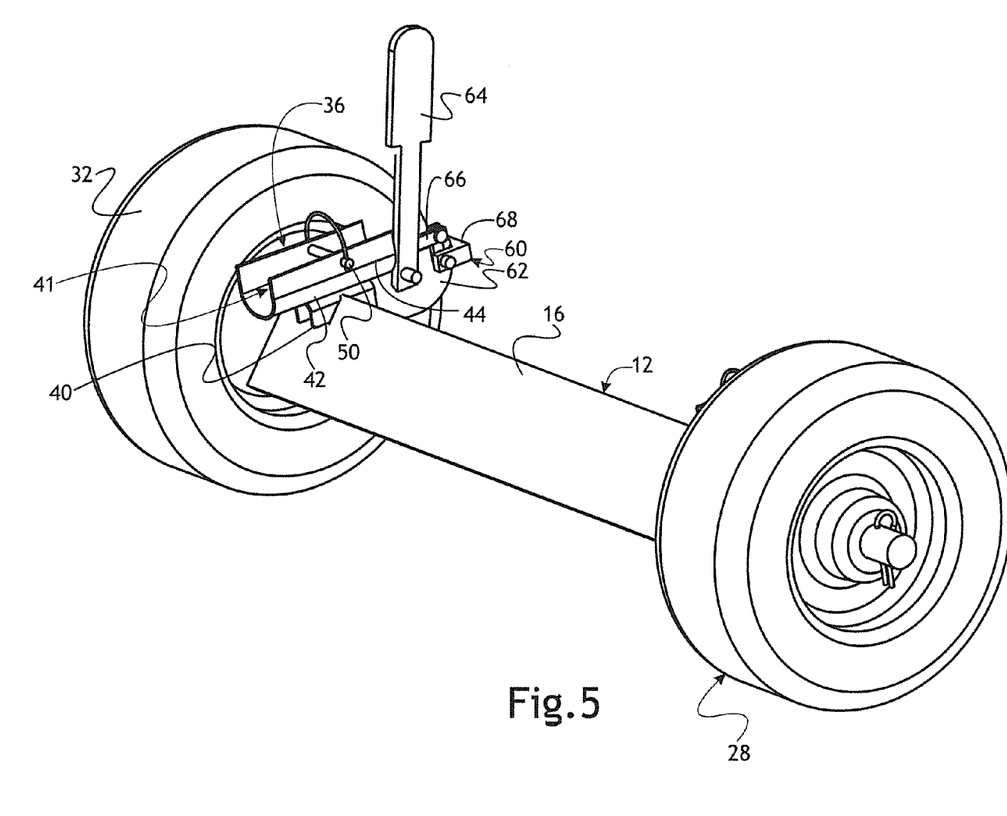
FIG. 5 is a perspective view of one embodiment.

The device 10 may also include a brake assembly, generally indicated at 60. The brake assembly 60 is moveable between engaged and disengaged positions to selectively engage the wheel assembly 28. In one embodiment, as best seen in FIG. 5, the brake assembly 60 may include a support plate 62. The brake assembly 60 may include a handle 64 pivotally mounted on the support plate 62. The brake assembly 60 may further include a linkage member 66. The linkage member 66 may be pivotally secured to a tire engagement member 68. The tire engagement member 68 may selectively engage the tire 32 to inhibit movement of the tire 32 to thereby inhibit movement of the conveying device in the event it may be necessary to secure the conveying device. That is, handle 64 may be pivoted relative to the support plate 62 causing tire engagement member 68 to engage the tire 32. Similarly, handle 64 may be pivoted relative to the support plate 62 causing the tire engagement member 68 to disengage the tire 32.

It will be appreciated that any suitable brake assembly 60 may be used. Further, the brake assembly 60 may act on any portion of the tire assembly 30 or axle 32.

In order to assemble a device 10 according to one embodiment, the top 16 is obtained. The axle housing 20 may be fixed to the top 16, adjacent the apex, such as by welding. The bottom 14 may be then positioned adjacent the axle housing 20 with the edges of the bottom 14 in proximity to the two walls of the top 16. The bottom 14 may be secured to the top such as by welding, and having the axle housing 20 disposed between the top 16 and bottom 14. A pair of coupling receivers 36 may be secured on the top 16 and along the longitudinal axis of the top 16. This may be done by welding the walls 40 of the coupling receivers 36 to the top 16. The coupling receivers 36 may be spaced along the top 16 such that they can each engage a different portion of the support structure. In one embodiment, one receiver 36 may engage a generally horizontally disposed support structure adjacent one leg of the conveying equipment and the other receiver 36 may engage a generally horizontally disposed support structure adjacent another leg of the conveying equipment. In this manner either of the two front or two rear wheels of the conveying equipment are supported at a position above the ground.

The axle 22 may then be placed into the axle housing 20. The axle 22 is inserted into the axle housing 20 such that the ends of the axle 22 may extend substantially equidistant from the respective ends of the axle housing 20. A wheel assembly 28 may be positioned on each end of the axle 22 protruding from the axle housing 20. The retaining pins 34 may then be placed through apertures 26 in each end of the axle to thereby retain the wheel assembly 28 on the axle 22 between the retaining pins 34 and axle housing 20. The retaining pin 34 may then be locked in place in any suitable manner.

The device 10 may be releasably secured to conveying equipment. In one embodiment, the device 10 is placed adjacent either the front or rear legs of the conveying equipment and parallel to either the front or rear wheels. The conveying equipment may then be lifted and the generally horizontal support structure adjacent the legs can be placed into each receiving element 41 and supported thereby. The clevis pins 50 may then be passed through apertures 46 and the locking clips 52 may be secured in the well known manner. The support structure of the conveying equipment is thus supported on the device 10 and is retained between the receiving element 41 and the clevis pins 50, as can be seen in FIG. 6.

When the device 10 is connected to the conveying equipment, the device may effectively increase the wheel base of the conveying equipment, aiding in the stability of the conveying equipment. This is because the wheel assemblies 28 of the devices 10 are laterally outside of the wheels of the conveying equipment (FIG. 6). Further the relatively larger tires 32 allow the conveying equipment, when connected to the device, to more easily traverse hostile terrain. In addition to the greater surface area of the tire aiding in moving the conveying equipment, the additional height of the wheel assembly 28 may hold the conveying equipment higher off the ground, increasing ground clearance between the conveying equipment. Also the load carrying capacity of the conveying equipment over hostile terrain may be effectively increased as a result of using the device 10. The larger tires 32 may distribute the load over a greater area, thus reducing tire trenching which may be a problem in certain instances with conventional conveying equipment.

It will be appreciated that only one device 10 may be used in conjunction with conveying equipment. In this embodiment, the device 10 may create a wheelbarrow effect. The end of the conveying equipment opposite the end to which the device 10 is attached can be pivoted by a user and the conveying equipment can be moved on the wheel assemblies 28 of the device 10. In another embodiment, two devices 10 may be used in conjunction with the conveying equipment; one device 10 disposed on each of the front and rear ends. In this embodiment, all of the wheels of the conveying equipment are off the ground and the wheel assemblies 28 of the devices 10 are used to support and move the conveying equipment.

The device 10 can thus be easily secured to conveying equipment to enhance the mobility of the conveying equipment. Further, the device 10 can easily be removed from the conveying equipment when its use may not be necessary. It will also be appreciated that the device can be used in connection with equipment that may not ordinarily have wheels, thus providing the ability to move such equipment.

An alternate embodiment of the device 10' is shown in FIGS. 7-11. The device 10' may include a base, generally indicated at 12'. The base 12' may comprise an elongated portion 102 portion. The base 12' may further comprise a wheel assembly mounting portion generally indicated at 104. The base 12' may further comprise a retaining portion generally indicated at 106.

Figure 8:
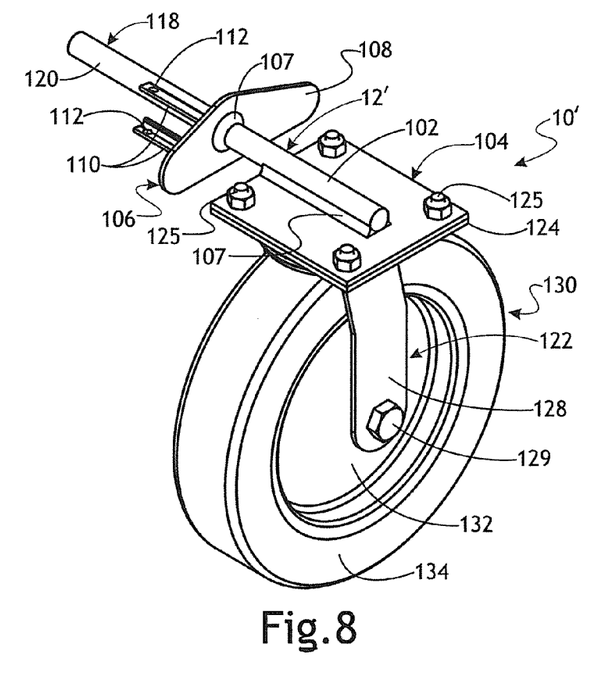
FIG. 8 is a perspective view of an embodiment.

As shown in FIG. 8, the elongated portion 102 may comprise a tubular structure. The tubular structure may have a generally circular cross-section. The wheel assembly mounting portion 104 may be secured at one end of the tubular structure. The wheel assembly mounting portion may comprise a generally flat plate that may be secured to the tubular structure. In one embodiment, each of the tubular structure and the generally flat plate may be made of metal, and may be secured such as by welding 107. It will be appreciated, however, that each of the tubular structure and the generally flat plate may comprise any other suitable material, such as by way of non-limiting example, plastic or composite, or combinations thereof. Further, the generally flat plate may be secured with the tubular structure in any other suitable manner such as by way of non-limiting example, mechanical fasteners or adhesives. Alternatively, the generally flat plate and the tubular structure may be made as a single piece. It will also be appreciated that the tubular structure may be a solid structure in which embodiment, rather than having a generally hollow interior, the tubular structure may be a solid cylindrical member.

Figure 9:
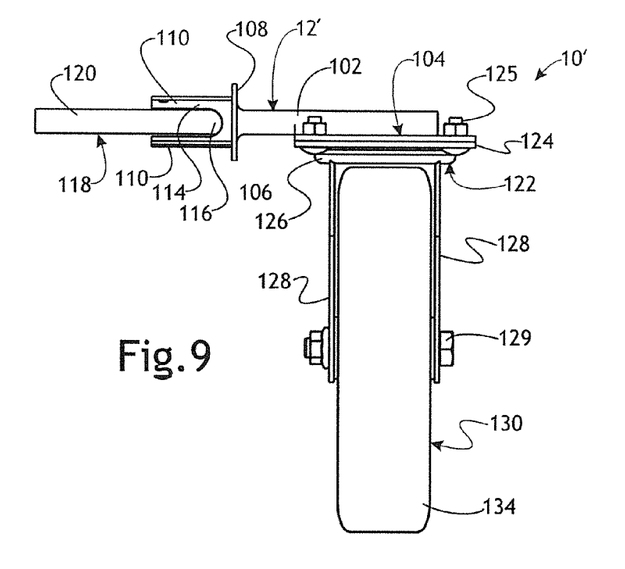
FIG. 9 is a front elevational view of an embodiment.

The retaining portion 106 may be disposed on the tubular structure. In one embodiment, the retaining portion 106 may be disposed on the tubular structure at the end opposite end from the generally flat plate. The retaining portion 106 may comprise a flange 108 and a pair of arms 110 extending from the flange 108. Each of the arms 110 may include an aperture 112 therethrough. As best seen in FIG. 9, a web 114 may be disposed between the arms 110. The web 114 may have a generally U-shaped recess 116.

The retaining portion 106 may comprise any suitable material, such as by way of non-limiting example, metal, plastic, composite, or combinations thereof. The retaining portion 106 may be secured to the tubular structure in any suitable manner, such as by way of non-limiting example, welding 107, mechanical fasteners or adhesives. Alternatively, the retaining portion 106 may be integrally formed with the tubular structure.

The device 10' may also include a coupling portion generally indicated at 118. The coupling portion 118 may be configured to engage a portion of the conveying equipment, and preferably the support structure of the conveying equipment and may support at least a portion of the conveying equipment. In an embodiment, the coupling portion may comprise a coupling rod 120. The coupling rod 120 may be in the form of a cylinder, having a generally circular cross section. It will be appreciated, however, that the coupling rod 120 may take any suitable configuration. In an embodiment, the coupling rod 120 may have an outer diameter that is less than the inner diameter of the tubular structure of the base 12'. In this manner, the coupling rod 120 can be inserted into and engages the tubular structure. Once the coupling rod 120 is inserted into the tubular structure, it may be secured therein, such as by of non limiting example, welding, the use of mechanical fasteners or adhesives. It will be appreciated, however the coupling rod need not be secure in the tubular structure. The coupling rod 120 may comprise any suitable material, such as by way of non-limiting example, metal, plastic, composite, or combinations thereof.

The coupling rod 120 may extend outwardly from the tubular structure and beyond the flange 108. In an embodiment, the coupling rod 120 may extend a distance beyond the arms 110. The coupling rod 120 is configured to engage the conveying equipment. More specifically, the support structure or frame of some conveying equipment may include a horizontal support. The horizontal support may comprise a tube extending between the front wheels of the conveying equipment. The support structure or frame may also include a second horizontal support extending between the rear wheels of the conveying equipment. The coupling rod 120 may have an outer diameter that is less than the inner diameter of the tube of the horizontal support. In this manner, the coupling rod 120 may be inserted into the tube of the horizontal support, in the direction of the arrow shown in FIG. 10. The coupling rod 120 may engage the tube and may support at least a portion of the conveying equipment. While the coupling rod 120 is described as a separate component from the tubular structure of the base, it will be appreciated that the coupling rod 120 and tubular structure may comprise an integral unit, and also may be formed together. In such an embodiment, the coupling rod 120 may not extend into the tubular structure. In this manner, the coupling rod 120 engages the tubular structure by being integral therewith.

The conveying equipment may also include as part of the support structure or frame additional tubular members at the sides thereof, each having a horizontal portion that extends generally rearwardly form the tubular member extending between the front wheels and generally forwardly from the tubular member extending between the rear wheels. The web 114 is adapted to be placed around the additional tubular members. More specifically, the base 12' is positioned adjacent the tubular members of the support structure extending between the front or rear wheels. The coupling rod 120 is inserted into the tubular members and the base 12' is moved in the direction of the arrow of FIG. 10 until the additional tubular members are positioned within the generally U-shaped recess 116 of the web 114. When the additional tubular members are positioned within the generally U-shaped recess 116, the arms 110 may extend over and under the additional tubular members, such that the additional tubular members are positioned between the arms 110. A suitable retaining pin 113 may then be inserted into the apertures 112 of adjacent arms 110 to thereby retain the additional tubular member in the generally U-shaped recess 116. In this way, the base 12' may be secured to the support structure of the conveying equipment. It will be appreciated, however, that the flange 108, arms 110 and web 114 may not be necessary. In such an embodiment, the coupling rod 120 may be of sufficient length that when it is inserted into the tubular member, it will remain therein until removed.

The device 10' further may include a wheel support assembly generally indicated at 122. The wheel support assembly 122 may comprise a mounting plate 124. The mounting plate may be configured to be secured to the generally flat plate of the wheel assembly mounting portion 104. In one embodiment, the generally flat plate and the mounting plate 124 may have aligning apertures that can receive suitable fasteners 1256, such as bolts secured by nuts. It will be appreciated that any suitable fastener may be sued to secure the generally flat plate with the mounting plate 124.

In an embodiment, the wheel support assembly 122 may also include a swivel joint 126 connected to the mounting plate 124. The swivel joint 126 may in turn be connected to a pair of wheel support brackets 128. The wheel support brackets 128 may be in the form of a fork of the type well-known in caster arrangements. Alternatively, the wheel support brackets 128 may be individually secured to the swivel joint 126 or to the mounting plate 124. The wheel support brackets 128 are spaced from one another to accommodate a wheel assembly 130 therebetween. When a swivel joint 126 is used, the swivel joint 126 permits rotation of the wheel support brackets 128 and the wheel assembly 28'. This permits the wheel assembly 130 to rotate. In one embodiment, the arrangement may be of the type commonly used as casters, allowing pivoting or rotational movement of the wheel assembly 28' via the swivel joint 126 relative to the mounting plate 124. When a swivel joint 126 is not used, the wheel assembly may not rotate or pivot relative to the mounting plate 124.

A wheel assembly, generally indicated at 130 may be mounted between the wheel support brackets 128 on an axle 129. The axle 129 may be mounted to the wheel support brackets 128 and extend therebetween. The wheel assembly 130 comprises a hub 132 and a tire 134. The hub 132 may include internal bearings (not shown) that allow the wheel assembly 130 to rotate about the axle 129 in conventional manner. Thus, the wheel assembly 130 may be rotatably disposed on the axle 129 between the wheel support brackets 128. The hub 132 can comprise any suitable material, including plastic, metal or composite material or combinations.

The tire 134 is disposed about the hub 132. In one embodiment, the tire 134 is a pneumatic tire that can include an inner-tube (not shown) or be of the tubeless variety, as are well-known. The tire 134 may also include a tread, but a tread is not necessary. Any suitable tread design may be used.

The wheel assembly 130 may be sized so that it can hold the conveying equipment off the ground during use. (FIGS. 10-11) In one embodiment, the outer diameter of the tire 134 may be up to about 13 inches. Also, in one embodiment, the width of the tire 134 may be up to about 5 inches. The specific outer diameter and width of the tire 134 may differ, and any suitable size may be used. Further, it is preferred that the wheel assembly 130 have sufficient load rating to allow the wheel assembly 130 to be used in the device 10' to convey the equipment and any necessary load on the conveying equipment, such as a patient or medical equipment. In one embodiment, the wheel assembly 130 may have a load rating at or above four hundred and thirty-five pounds.

The devices 10' may be releasably secured to conveying equipment. In one embodiment, the devices 10' may be placed at either the front or rear of the support structure of the conveying equipment. The conveying equipment may then be lifted and the coupling rod 120 may be inserted into the tube of the horizontal support. The coupling rod 120 may engage the tube and may support at least a portion of the conveying equipment. The coupling rod 120 is inserted into the tubular members and the base 12' is moved until the additional tubular members are positioned within the generally U-shaped recess 116 of the web 114. When the additional tubular members are positioned within the generally U-shaped recess 116, the arms 110 may extend over and under the additional tubular members, such that the additional tubular members are positioned between the arms 110. A suitable retaining pin 113 may then be inserted into the apertures 112 of adjacent arms 110 to thereby retain the additional tubular member in the generally U-shaped recess 116.

In order to remove the device from the conveying equipment, the retaining pin 113 is removed. The coupling rod is then moved so as to remove it from engagement with the support structure of the conveying equipment.

Figure 10:
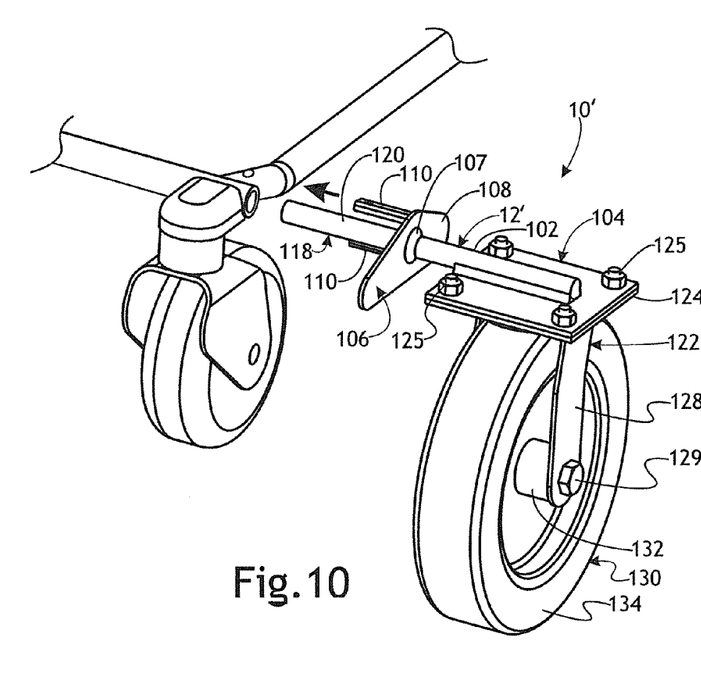
FIG. 10 is an exploded view of a portion of FIG. 11.
Figure 11:
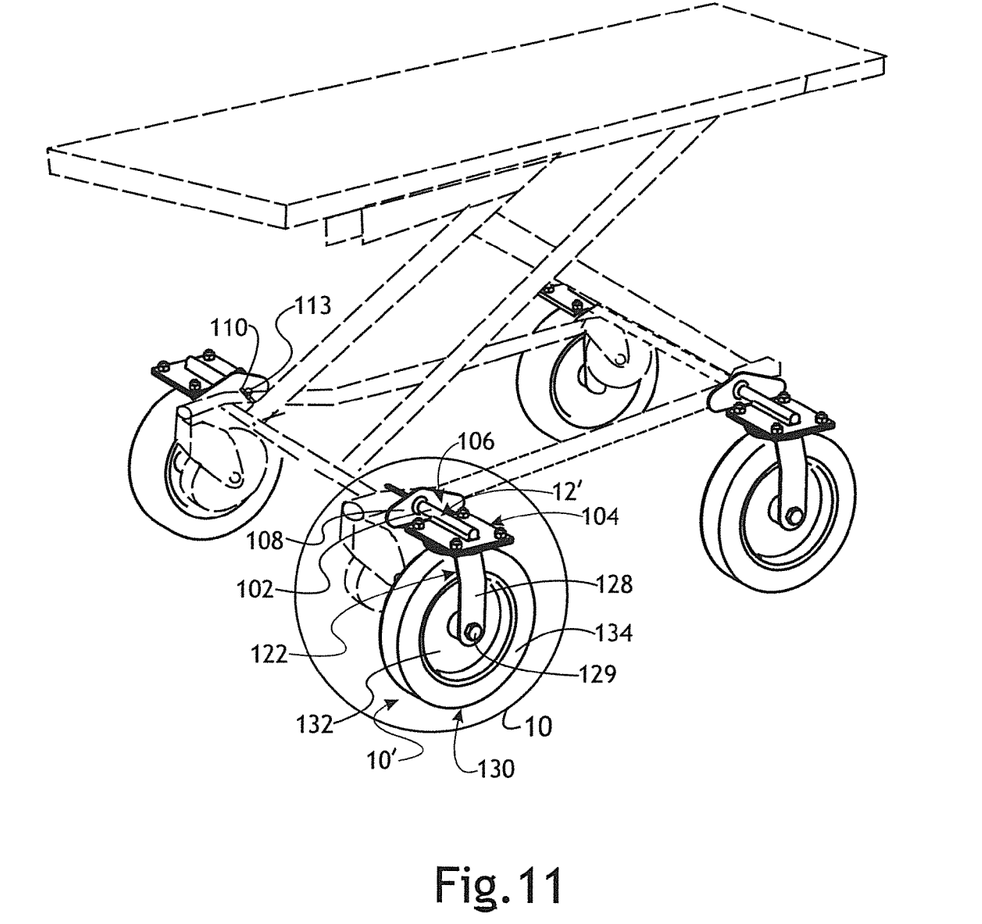
FIG. 11 is a perspective view of an embodiment attached to conveying equipment.

When the devices 10' are connected to the conveying equipment, the devices 10' may effectively increase the wheel base of the conveying equipment, aiding in the stability of the conveying equipment. This is because the wheel assemblies 130 of the devices 10' may be disposed laterally outside of the wheels of the conveying equipment (FIGS. 10-11). Further the relatively larger tires 134 allow the conveying equipment, when connected to the device, to more easily traverse hostile terrain. In addition to the greater surface area of the tire aiding in moving the conveying equipment, the additional height of the wheel assembly 130 may hold the conveying equipment higher off the ground, increasing ground clearance between the conveying equipment. Also the load carrying capacity of the conveying equipment over hostile terrain may be effectively increased as a result of using the devices 10'. The relatively larger tires 134 may distribute the load over a greater area, thus reducing tire trenching which may be a problem in certain instances with conventional conveying equipment.

It will be appreciated that only two devices 10' one may be used in conjunction with conveying equipment. In such a case the two devices 10' may be placed at the front of the conveying equipment support structure, or alternatively the two devices 10' may be placed at the rear of the conveying equipment support structure. In such an arrangement, the devices 10' may create a wheelbarrow effect. The end of the conveying equipment opposite the end to which the devices 10' are attached can be pivoted by a user and the conveying equipment can be moved on the wheel assemblies 130 of the device 10'. In another embodiment, four devices 10' may be used in conjunction with the conveying equipment; two devices 10' disposed on each of the front and rear ends of the conveying equipment support structure. In such an arrangement embodiment, all of the wheels of the conveying equipment may be off the ground and the wheel assemblies 130 of the devices 10' are used to support and move the conveying equipment. It will be appreciated the in any case, any of the devices 10' may have a fixed wheel assembly, or may include a pivoting wheel assembly.

The devices 10' can thus be easily secured to conveying equipment to enhance the mobility of the conveying equipment. Further, the devices 10' can easily be removed from the conveying equipment when its use may not be necessary. It will also be appreciated that the device can be used in connection with equipment that may not ordinarily have wheels, thus providing the ability to move such equipment.

The device has been described as having many parts that may be secured together. It will be appreciated that any of the components described herein may be combined and integrally formed from one piece. Additionally some of the components may be eliminated in certain embodiments.

The foregoing description is considered illustrative only of the principles of the invention. The terminology that is used is intended to be in the nature of words of description rather than of limitation. Furthermore, because numerous modifications and changes will readily occur to those skilled in the art, it is not desired to limit the invention to the exact construction and process shown as described above. Accordingly, all suitable modifications and equivalents that may be resorted to fall within the scope of the invention as defined by the claims that follow.

What is claimed is:

1. A mobilization device adapted to be attached to a piece of patient conveying equipment comprising:
   a base having an wheel assembly mounting portion;
   a wheel support assembly disposed on the wheel assembly mounting portion, the wheel support assembly comprises a swivel joint and a pair of spaced wheel support brackets supporting an axle therebetween;
   a wheel assembly connected to the wheel support assembly and rotatably disposed on the axle; and
   a coupling portion engaging the base, the coupling portion comprising a coupling rod insertable into a support structure of a piece of patient conveying equipment having at least one wheel supported on the support structure;
   wherein the wheel assembly is sized to hold the wheel of the piece of patient conveying equipment above ground when the coupling rod is inserted into the support structure of the piece of patient conveying equipment and the piece of patient conveying equipment is being conveyed relative to the ground on the mobilization device with the wheel assembly being in contact with the ground.

2. A mobilization device as set forth in claim 1 wherein the base further comprises an elongated portion, the coupling portion engaging the elongated portion.

3. A mobilization device as set forth in claim 2 wherein the coupling portion comprises a coupling rod and the elongated portion comprises a tubular structure, the coupling portion contacting the tubular structure.

4. A mobilization device as set forth in claim 3 wherein the base further comprises a retaining portion.

5. A mobilization device as set forth in claim 4 wherein the retaining portion comprises a web for receiving a portion of the conveying equipment.

6. A mobilization device as set forth in claim 2 wherein wheel assembly mounting portion comprises a generally flat plate.

7. A mobilization device as set forth in claim 1 wherein the wheel assembly has a diameter greater than a diameter of the wheel that is supported on the support structure of the piece of patient conveying equipment to thereby hold the piece of patient conveying equipment above ground when the coupling rod is inserted into the support structure of the piece of patient conveying equipment and the piece of patient conveying equipment is being conveyed relative to the ground on the mobilization device with the wheel assembly being in contact with the ground.

8. A mobilization device as set forth in claim 1 wherein said wheel assembly is configured to be disposed outside of the support structure and the wheel supported on the support structure of the piece of patient conveying equipment.

9. A piece of patient conveying equipment comprising:
   a patient conveying member for holding a patient;
   a foldable support structure that supports the patient conveying member, the foldable support structure having connected thereto a pair of spaced apart front wheels at a front end of the support structure and a pair of spaced apart rear wheels at a rear end of the support structure, each of the front wheels and the rear wheels having a diameter; and
   a mobilization device connected to the support structure at least at each of the front wheels or each of the rear wheels, each of the mobilization devices including a wheel assembly having a diameter and being located laterally outside of its respective wheel of the support structure, and wherein the diameter of each wheel assembly is greater than the diameter of the wheel of the support structure outside of which the wheel assembly is located to thereby hold the at least each of the front wheels or each of the rear wheels of the support structure above ground when and the wheel assembly of each of the mobilization devices is in contact with the ground.

10. A piece of patient conveying equipment as set forth in claim 9 wherein a mobilization device is connected to the support structure laterally outside of each of the front wheels and the rear wheels to thereby hold the front wheels and the rear wheel above ground when and the wheel assembly of each of the mobilization devices is in contact with the ground.

11. A piece of patient conveying equipment as set forth in claim 9 wherein each of the mobilization devices further comprises:
   a base;
   a coupling portion connected with the base and engageable with the foldable support structure of the piece of patient conveying equipment and supporting at least a portion of the conveying equipment, wherein the wheel assembly is connectable with the base.

12. A piece of patient conveying equipment as set forth in claim 10 wherein each of the mobilization devices further comprises:
   a base;
   a coupling portion connected with the base and engageable with the foldable support structure of the piece of patient conveying equipment and supporting at least a portion of the conveying equipment, wherein each wheel assembly is connectable with the base.

* * * * *